United States Patent
Zhou et al.

(10) Patent No.: US 11,435,538 B2
(45) Date of Patent: Sep. 6, 2022

(54) OPTICAL FIBER STRUCTURES AND METHODS FOR BEAM SHAPING

(71) Applicant: PANASONIC INTELLECTUAL PROPERTY MANAGEMENT CO., LTD, Osaka (JP)

(72) Inventors: Wang-Long Zhou, Andover, MA (US); Francisco Villarreal-Saucedo, Middleton, MA (US)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/675,655

(22) Filed: Nov. 6, 2019

(65) Prior Publication Data
US 2020/0147720 A1 May 14, 2020

Related U.S. Application Data

(60) Provisional application No. 62/758,731, filed on Nov. 12, 2018.

(51) Int. Cl.
| | |
|---|---|
| G02B 6/42 | (2006.01) |
| G02B 6/02 | (2006.01) |
| G02B 6/036 | (2006.01) |
| B23K 26/06 | (2014.01) |
| B23K 26/064 | (2014.01) |
| G02B 27/09 | (2006.01) |
| B23K 26/03 | (2006.01) |
| G02B 6/028 | (2006.01) |

(Continued)

(52) U.S. Cl.
CPC ............ G02B 6/4296 (2013.01); B23K 26/06 (2013.01); B23K 26/064 (2015.10); G02B 6/02042 (2013.01); G02B 6/03677 (2013.01); G02B 6/03688 (2013.01); G02B 27/0994 (2013.01); B23K 26/032 (2013.01); B23K 26/0643 (2013.01); B23K 26/0648 (2013.01); B23K 26/21 (2015.10); B23K 26/38 (2013.01); G02B 6/0283 (2013.01); G02B 6/03605 (2013.01); G02B 6/4214 (2013.01)

(58) Field of Classification Search
None
See application file for complete search history.

(56) References Cited

U.S. PATENT DOCUMENTS

| | | |
|---|---|---|
| 5,553,185 A | 9/1996 | Antos et al. |
| 6,072,929 A | 6/2000 | Kato et al. |
| 6,317,552 B1 | 11/2001 | Berkey |

(Continued)

FOREIGN PATENT DOCUMENTS

WO 2012102138 A1 8/2012

OTHER PUBLICATIONS

International Search Report and Written Opinion Corresponding to International Application No. PCT/US2019/060020 dated Apr. 27, 2020, 18 pages.

*Primary Examiner* — Michelle R Connelly
(74) *Attorney, Agent, or Firm* — Morgan, Lewis & Bockius LLP

(57) ABSTRACT

In various embodiments, optical fibers have arrangements of core, annular core, and cladding regions enabling variation of beam shape and/or beam parameter product and may be utilized for the processing (e.g., welding, cutting, drilling, etc.) of various workpieces.

17 Claims, 12 Drawing Sheets

(51) Int. Cl.
    *B23K 26/21*        (2014.01)
    *B23K 26/38*        (2014.01)

(56)             References Cited

U.S. PATENT DOCUMENTS

|  |  |  |  |
|---|---|---|---|
| 6,363,196 B1 | 3/2002 | Rousseau et al. | |
| 8,399,803 B2 * | 3/2013 | Idaka | B23K 26/03 |
| | | | 700/166 |
| 10,088,632 B2 | 10/2018 | Zhou et al. | |
| 10,451,797 B2 | 10/2019 | Wang et al. | |
| 10,682,726 B2 * | 6/2020 | Gross | B23K 26/064 |
| 10,732,439 B2 * | 8/2020 | Kliner | B23K 26/067 |
| 11,022,747 B2 * | 6/2021 | Kangastupa | B23K 26/0608 |
| 2002/0006256 A1 | 1/2002 | Inagaki et al. | |
| 2002/0097971 A1 | 7/2002 | Mukasa et al. | |
| 2003/0021562 A1 | 1/2003 | Kumano | |
| 2006/0219673 A1 * | 10/2006 | Varnham | B23K 26/0734 |
| | | | 219/121.85 |
| 2007/0065081 A1 | 3/2007 | Antona et al. | |
| 2013/0272668 A1 | 10/2013 | Sato et al. | |
| 2015/0293306 A1 * | 10/2015 | Huber | B23K 26/067 |
| | | | 385/18 |
| 2017/0293084 A1 * | 10/2017 | Zhou | G02B 6/32 |
| 2018/0031762 A1 | 2/2018 | Bookbinder et al. | |
| 2018/0088358 A1 * | 3/2018 | Kliner | B33Y 30/00 |
| 2018/0210144 A1 | 7/2018 | Villarreal-Saucedo et al. | |
| 2018/0210212 A1 | 7/2018 | Li et al. | |
| 2018/0212395 A1 * | 7/2018 | Kliner | G02B 6/02 |
| 2018/0233875 A1 | 8/2018 | Jollivet et al. | |

* cited by examiner

| DIAMETER (μm) | REFRACTIVE INDEX | OTHERS |
|---|---|---|
| $D_0 = 100$ | $n_0 = n_2 = 1.45076$ | BARRIER THICKNESS $T = 10\mu m$ |
| $D_1 = 150$ | $n_0 = n_{2b}$ | |
| $D_2 = 390$ | $\sqrt{n_0^2 - n_1^2} = 0.12$ | |
| $D_b = 225$ | $\sqrt{n_0^2 - n_3^2} = 0.22$ | |

OPTICAL FIBER STRUCTURES AND METHODS FOR BEAM SHAPING

RELATED APPLICATIONS

This application claims the benefit of and priority to U.S. Provisional Patent Application No. 62/758,731, filed Nov. 12, 2018, the entire disclosure of which is hereby incorporated herein by reference.

TECHNICAL FIELD

In various embodiments, the present invention relates to laser systems and optical fibers, specifically laser systems and optical fibers with controllable beam profiles, e.g., variable beam parameter products.

BACKGROUND

High-power laser systems are utilized for a host of different applications, such as welding, cutting, drilling, and materials processing. Such laser systems typically include a laser emitter, the laser light from which is coupled into an optical fiber (or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). That is, BPP=NA×D/2, where D is the focusing spot (the waist) diameter and NA is the numerical aperture; thus, the BPP may be varied by varying NA and/or D. The BPP quantifies the quality of the laser beam and how well it can be focused to a small spot, and is typically expressed in units of millimeter-milliradians (mm-mrad). A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

In many laser-processing applications, the desired beam spot size, divergence, and beam quality may vary depending on, for example, the type of processing and/or the type of material being processed. This is particularly true for industrial lasers in material processing applications. For example, a lower BPP value, i.e., a better beam quality, may be preferred for cutting a thin metal, while a larger BPP (i.e., a worse beam quality) may be preferred for cutting through thicker metals. In order to make such changes to the BPP of the laser system, frequently the output optical system or the optical fiber must be swapped out with other components and/or realigned, a time-consuming and expensive process that may even lead to inadvertent damage of the fragile optical components of the laser system. Thus, there is a need for alternative techniques for varying the BPP of a laser system that do not involve such adjustments to the laser beam or optical system at the output of the optical fiber.

SUMMARY

Various embodiments of the present invention provide laser systems and optical fibers that enable variation of the BPP and/or shape of an output laser beam while minimizing or substantially eliminating optical power losses. Embodiments of the invention provide optical fibers having complex configurations of core and cladding regions, as well as systems utilizing such fibers to deliver laser energy, e.g., to a workpiece for processing thereof. Exemplary optical fibers in accordance with embodiments of the invention feature an annular core region incorporating (i) a sub-region of graded refractive index, (ii) sub-regions having different refractive indices in a stepped profile, or (iii) a low-refractive-index barrier layer. Optical fibers in accordance with embodiments of the present invention may therefore be utilized to form exit beams having a wide variety of BPPs and/or beam shapes unattainable using conventional optical fibers.

Structurally, optical fibers in accordance with embodiments of the invention may include one or more layers of high and/or low refractive index beyond (i.e., outside of) the exterior cladding without altering the principles of the present invention. Such additional layers may also be termed claddings, coatings, or annular cores, but may not guide light. Such variants are within the scope of the present invention. The various core and cladding layers of fibers in accordance with various embodiments of the invention may include, consist essentially of, or consist of glass, such as substantially pure fused silica and/or fused silica doped with fluorine, titanium, germanium, and/or boron. Obtaining a desired refractive index for a particular layer or region of an optical fiber in accordance with embodiments of the invention may be accomplished (by techniques such as doping) by one of skill in the art without undue experimentation. Optical fibers described herein may be multi-mode optical fibers.

Herein, "optical elements" may refer to any of lenses, mirrors, prisms, gratings, and the like, which redirect, reflect, bend, or in any other manner optically manipulate electromagnetic radiation, unless otherwise indicated. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The input beams received in the embodiments herein may be single-wavelength or multi-wavelength beams combined using various techniques known in the art. The output beams produced in embodiments of the invention may be single-wavelength or multi-wavelength beams.

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein. Multi-wavelength output beams of WBC systems may be utilized as input beams in conjunction with embodiments of the present invention for, e.g., BPP control.

Output beams produced in accordance with embodiments of the present invention may be utilized to process a workpiece such that the surface of the workpiece is physically altered and/or such that a feature is formed on or within the surface, in contrast with optical techniques that merely probe a surface with light (e.g., reflectivity measurements) and with optical beams utilized for data transmission. Exemplary processes in accordance with embodiments of the invention include cutting, welding, drilling, and soldering. As such, optical fibers detailed herein may have at their output ends a laser head configured to focus the output beam from the fiber toward a workpiece to be processed. The laser head may include, consist essentially of, or consist of one or more optical elements for focusing and/or collimating the output beam, and/or controlling the polarization and/or the trajectory of the beam. The laser head may be positioned to emit the output beam toward a workpiece and/or toward a platform or positionable gantry on which the workpiece may be disposed.

Various embodiments of the invention may also process workpieces at one or more spots or along a one-dimensional linear or curvilinear processing path, rather than flooding all or substantially all of the workpiece surface with radiation from the laser beam. In general, processing paths may be curvilinear or linear, and "linear" processing paths may feature one or more directional changes, i.e., linear processing paths may be composed of two or more substantially straight segments that are not necessarily parallel to each other. Similarly, "curvilinear" paths may be composed of multiple curvilinear segments with directional changes therebetween. Other processing paths in accordance with embodiments of the invention include segmented paths in which each segment is linear or curvilinear, and a directional change may be present between any two of the segments.

Embodiments of the invention may vary beam shape and/or BPP to improve or optimize performance for different types of processing techniques or different types of materials being processed. Embodiments of the invention may utilize various additional techniques for varying BPP and/or shape of laser beams described in U.S. patent application Ser. No. 14/632,283, filed on Feb. 26, 2015, U.S. patent application Ser. No. 14/747,073, filed Jun. 23, 2015, U.S. patent application Ser. No. 14/852,939, filed Sep. 14, 2015, U.S. patent application Ser. No. 15/188,076, filed Jun. 21, 2016, U.S. patent application Ser. No. 15/479,745, filed Apr. 5, 2017, and U.S. patent application Ser. No. 15/649,841, filed Jul. 14, 2017, the disclosure of each of which is incorporated in its entirety herein by reference.

In an aspect, embodiments of the invention feature a gradient step-clad optical fiber that includes, consists essentially of, or consists of a center core, a first cladding surrounding the center core, an annular core surrounding the first cladding, and a second cladding surrounding the annular core. The center core has a first refractive index. The first cladding has a second refractive index smaller than the first refractive index. The second cladding has a third refractive index smaller than the first refractive index. The annular core includes, consists essentially of, or consists of a first region and a second region. The first region has a fourth refractive index greater than the second refractive index. The refractive index of the second region varies between (i) a fifth refractive index less than or equal to the fourth refractive index and (ii) a sixth refractive index greater than or equal to the second refractive index.

Embodiments of the invention may include one or more of the following in any of a variety of combinations. The first region may be disposed between the second region and the second cladding. The second region may be disposed between the first region and the second cladding. The variation in refractive index of the second region may be linear, non-linear, parabolic, polynomial, or stepped. The fourth refractive index may be equal to the first refractive index. The fourth refractive index may be larger than the first refractive index. The fourth refractive index may be smaller than the first refractive index. The second refractive index may be equal to the third refractive index. The second refractive index may be larger than the third refractive index. The second refractive index may be smaller than the third refractive index. The thickness of the first region may be equal to the thickness of the second region. The thickness of the first region may be less than the thickness of the second region. The thickness of the first region may be greater than the thickness of the second region. The fifth refractive index may be less than the fourth refractive index. The fifth refractive index may be equal to the fourth refractive index. The sixth refractive index may be greater than the second refractive index. The sixth refractive index may be equal to the second refractive index.

In another aspect, embodiments of the invention feature a gradient step-clad optical fiber that includes, consists essentially of, or consists of a center core, an annular core surrounding the center core, and a first cladding surrounding the annular core. The center core has a first refractive index. The first cladding has a second refractive index smaller than the first refractive index. The annular core includes, consists essentially of, or consists of a first region and a second region. The first region has a third refractive index greater than the second refractive index. The refractive index of the second region varies between (i) a fourth refractive index less than or equal to the third refractive index and (ii) a fifth refractive index less than the fourth refractive index.

Embodiments of the invention may include one or more of the following in any of a variety of combinations. The first region may be disposed between the second region and the first cladding. The second region may be disposed between the first region and the first cladding. The variation in refractive index of the second region may be linear, non-linear, parabolic, polynomial, or stepped. The third refractive index may be equal to the first refractive index. The third refractive index may be larger than the first refractive index. The third refractive index may be smaller than the first refractive index. The fifth refractive index may be equal to the second refractive index. The fifth refractive index may be larger than the second refractive index. The fifth refractive index may be smaller than the second refractive index. The thickness of the first region may be equal to the thickness of the second region. The thickness of the first region may be less than the thickness of the second region. The thickness of the first region may be greater than the thickness of the second region. The fourth refractive index may be less than the third refractive index. The fourth refractive index may be equal to the third refractive index.

In yet another aspect, embodiments of the invention feature a multi-step-clad optical fiber that includes, consists essentially of, or consists of a center core, a first cladding surrounding the center core, an annular core surrounding the first cladding, and a second cladding surrounding the annular core. The center core has a first refractive index. The first cladding has a second refractive index smaller than the first refractive index. The second cladding has a third refractive index smaller than the first refractive index. The annular core includes, consists essentially of, or consists of a first region and a second region. The first region has a fourth refractive index greater than the second refractive index. The second region has a fifth refractive index greater than the second refractive index and smaller than the fourth refractive index.

Embodiments of the invention may include one or more of the following in any of a variety of combinations. The first region may be disposed between the second region and the second cladding. The second region may be disposed between the first region and the second cladding. The second refractive index may be equal to the third refractive index. The second refractive index may be larger than the third refractive index. The second refractive index may be smaller than the third refractive index. The fourth refractive index may be equal to the first refractive index. The fourth refractive index may be larger than the first refractive index. The fourth refractive index may be smaller than the first refractive index. The fifth refractive index may be equal to the first refractive index. The fifth refractive index may be larger than the first refractive index. The fifth refractive index may be smaller than the first refractive index. The thickness of the first region may be equal to the thickness of the second region. The thickness of the first region may be less than the thickness of the second region. The thickness of the first region may be greater than the thickness of the second region.

In another aspect, embodiments of the invention feature a barrier step-clad optical fiber that includes, consists essentially of, or consists of a center core, a first cladding surrounding the center core, an annular core surrounding the first cladding, and a second cladding surrounding the annular core. The center core has a first refractive index. The first cladding has a second refractive index smaller than the first refractive index. The second cladding has a third refractive index smaller than the first refractive index. The annular core includes, consists essentially of, or consists of a first region, a second region, and a third region disposed between the first and second regions. The first region has a fourth refractive index greater than the second refractive index. The second region has a fifth refractive index greater than the second refractive index. The third region has a sixth refractive index smaller than the fourth and fifth refractive indices.

Embodiments of the invention may include one or more of the following in any of a variety of combinations. The annular core may include a fourth region having a seventh refractive index greater than the second refractive index, and a fifth region, disposed between the second and fourth regions, having an eighth refractive index smaller than the fifth and seventh refractive indices. The seventh refractive index may be equal to the fourth refractive index and/or the fifth refractive index. The seventh refractive index may be larger than the fourth refractive index and/or the fifth refractive index. The seventh refractive index may be smaller than the fourth refractive index and/or the fifth refractive index. The eighth refractive index may be equal to the sixth refractive index. The eighth refractive index may be greater than the sixth refractive index. The eighth refractive index may be smaller than the sixth refractive index. The thickness of the fifth region may be equal to the thickness of the third region. The thickness of the fifth region may be less than the thickness of the third region. The thickness of the fifth region may be greater than the thickness of the third region.

The fourth refractive index may be equal to the fifth refractive index. The fourth refractive index may be larger than the fifth refractive index. The fourth refractive index may be smaller than the fifth refractive index. The fourth refractive index may be equal to the first refractive index. The fourth refractive index may be larger than the first refractive index. The fourth refractive index may be smaller than the first refractive index. The fifth refractive index may be equal to the first refractive index. The fifth refractive index may be larger than the first refractive index. The fifth refractive index may be smaller than the first refractive index. The sixth refractive index may be equal to the second refractive index. The sixth refractive index may be larger than the second refractive index. The sixth refractive index may be smaller than the second refractive index. The thickness of the first region may be equal to the thickness of the second region. The thickness of the first region may be less than the thickness of the second region. The thickness of the first region may be greater than the thickness of the second region. The thickness of the third region may be less than the thickness of the first region and/or a thickness of the second region. The thickness of the third region may be equal to the thickness of the first cladding. The thickness of the third region may be less than the thickness of the first cladding. The thickness of the third region may be greater than the thickness of the first cladding.

In yet another aspect, embodiments of the invention feature a barrier step-clad optical fiber that includes, consists essentially of, or consists of a center core, a first cladding surrounding the center core, an annular core surrounding the first cladding, and a second cladding surrounding the annular core. The refractive index of the center core is equal to a first refractive index at a center portion of the center core. The refractive index of the center core decreases, over at least a portion of a radius or thickness of the center core, to a second refractive index smaller than the first refractive index. The first cladding has a third refractive index smaller than the first refractive index. The second cladding has a fourth refractive index smaller than the first refractive index. The annular core includes, consists essentially of, or consists of a first region, a second region, and a third region disposed between the first and second regions. The first region has a fifth refractive index greater than the third refractive index. The second region has a sixth refractive index greater than the third refractive index. The third region has a seventh refractive index smaller than the fifth and sixth refractive indices.

Embodiments of the invention may include one or more of the following in any of a variety of combinations. The second refractive index may be equal to the third refractive index. The second refractive index may be greater than the third refractive index. The fifth refractive index may be equal to the sixth refractive index. The fifth refractive index may be larger than the sixth refractive index. The fifth refractive index may be smaller than the sixth refractive index. The fifth refractive index may be equal to the first refractive index. The fifth refractive index may be larger than the first refractive index. The fifth refractive index may be smaller than the first refractive index. The fifth refractive index may be equal to the second refractive index. The fifth refractive index may be larger than the second refractive index. The fifth refractive index may be smaller than the second refractive index. The sixth refractive index may be equal to the first refractive index. The sixth refractive index may be larger than the first refractive index. The sixth refractive index may be smaller than the first refractive index. The sixth refractive index may be equal to the second refractive index. The sixth refractive index may be larger than the second refractive index. The sixth refractive index may be smaller than the second refractive index. The seventh refractive index may be equal to the third refractive index. The seventh refractive index may be larger than the third refractive index. The seventh refractive index may be smaller than the third refractive index. The thickness of the first region may be equal to the thickness of the second region. The thickness of the first region may be less than the thickness of the second region. The thickness of the first region may be greater than the thickness of the second region. The thickness of the third region may be less than the thickness of the first region. The thickness of the third region may be less than the thickness of the second region. The thickness of the third region may be equal to the thickness of the first cladding. The thickness of the third region may be less than the thickness of the first cladding. The thickness of the third region may be greater than the thickness of the first cladding.

In another aspect, embodiments of the invention feature a laser system that includes, consists essentially of, or consists of a beam source for emission of an input laser beam, an optical fiber having an input end and an output end opposite the input end, an in-coupling mechanism, and a controller. The optical fiber includes, consists essentially of, or consists of any of the optical fibers described above or herein. The in-coupling mechanism receives the input laser beam and directs the input laser beam toward the input end of the optical fiber. The input laser beam is in-coupled into the optical fiber and emitted from the output end of the optical fiber as an output beam. The controller controls the in-coupling mechanism relative to the optical fiber to direct the input laser beam onto one or more in-coupling locations on the input end of the optical fiber. The beam parameter product and/or the numerical aperture and/or the beam shape of the output beam is determined at least in part by the one or more in-coupling locations.

Embodiments of the invention may include one or more of the following in any of a variety of combinations. The in-coupling mechanism may include, consist essentially of, or consist of one or more optical elements for focusing the input laser beam toward the input end of the optical fiber. The optical element(s) may be movable, in response to the controller, along (i) an axis substantially parallel to a propagation direction of the input laser beam and/or (ii) one or more axes substantially perpendicular to the propagation direction of the input laser beam. The in-coupling mechanism may include, consist essentially of, or consist of a steering mechanism for receiving the input laser beam and directing the input laser beam toward the optical fiber. The steering mechanism may include, consist essentially of, or consist of one or more reflectors. The optical element may include, consist essentially of, or consist of one or more lenses, one or more mirrors, and/or one or more prisms. The in-coupling mechanism may include, consist essentially of, or consist of a reflector for receiving the input laser beam and reflecting the input laser beam toward the optical fiber. The reflector may be rotatable (i.e., tiltable) in response to the controller. The in-coupling mechanism may include, consist essentially of, or consist of an optical element for receiving the input laser beam from the reflector and focusing the input laser beam toward the optical fiber. The optical element may be movable, in response to the controller, along (i) an axis substantially parallel to a propagation direction of the input laser beam and/or (ii) one or more axes substantially perpendicular to the propagation direction of the input laser beam. The optical element may include, consist essentially of, or consist of one or more lenses, one or more mirrors, and/or one or more prisms. The beam source may be responsive to the controller. The controller may be configured to direct the input laser beam onto a plurality of different in-coupling locations without modulating an output power of the input laser beam as the input laser beam is directed between the different in-coupling locations. The controller may be configured to direct the input laser beam onto at least one in-coupling location at least partially (or completely) overlapping the first cladding. Beam energy in-coupled into the first cladding may form at least a portion of the output beam. The controller may be configured to direct the input laser beam onto at least one in-coupling location at least partially (or completely) overlapping the first region and/or the second region. Beam energy in-coupled thereinto may form at least a portion of the output beam. A laser head may be coupled to the output end of the optical fiber. The laser head may direct the output beam toward a workpiece for processing thereof. The controller may be configured to direct the input laser beam onto the one or more in-coupling locations on the input end of the optical fiber based on (i) a type of processing to be performed on the workpiece, (ii) a property of the workpiece, and/or (iii) a processing path along which the workpiece is to be processed. The type of processing may be selected from the list consisting of cutting, welding, etching, annealing, drilling, soldering, or brazing. The property of the workpiece may include, consist essentially of, or consist of a thickness of the workpiece, a composition of the workpiece, a reflectivity of the workpiece, and/or a topography of the workpiece. The controller may be configured to direct the input laser beam onto the one or more in-coupling locations on the input end of the optical fiber based on one or more directional changes in the processing path. The beam source may include, consist essentially of, or consist of (i) one or more beam emitters emitting a plurality of discrete beams, (ii) focusing optics for focusing the plurality of beams toward a dispersive element, (iii) the dispersive element for receiving and dispersing the received focused beams, and (iv) a partially reflective output coupler positioned to receive the dispersed beams, transmit a portion of the dispersed beams therethrough as the input laser beam, and reflect a second portion of the dispersed beams back toward the dispersive element (and, e.g., thence to the one or more beam emitters to stabilize the emission wavelengths thereof). The input laser beam may be composed of multiple wavelengths. The dispersive element may include, consist essentially of, or consist of a diffraction grating (e.g., a transmissive diffraction grating or a reflective diffraction grating).

In yet another aspect, embodiments of the invention feature a method of processing a workpiece with a laser beam. An optical fiber having an input end and an output end opposite the input end is provided. The optical fiber includes, consists essentially of, or consists of any of the optical fibers any of the optical fibers described above or herein. A workpiece is disposed proximate the output end of the optical fiber. A beam parameter product, a numerical aperture, and/or a beam shape is determined for processing of the workpiece based at least in part on (i) a type of processing to be performed on the workpiece, (ii) a property of the workpiece, and/or (iii) a processing path along which the workpiece is to be processed. A laser beam is directed onto one or more in-coupling locations on the input end of the optical fiber to select the beam parameter product, the numerical aperture, and/or the beam shape of the laser beam emitted from the output end of the optical fiber. The workpiece is processed with the laser beam emitted from the output end of the optical fiber.

Embodiments of the invention may include one or more of the following in any of a variety of combinations. Processing the workpiece may include, consist essentially of, or consist of physically altering at least a portion of a surface of the workpiece. Processing the workpiece may include, consist essentially of, or consist of cutting, welding, etching, annealing, drilling, soldering, and/or brazing. The beam parameter product, the numerical aperture, and/or the beam shape may be determined based at least in part on a property of the workpiece. The property of the workpiece may include, consist essentially of, or consist of a thickness of the workpiece, a composition of the workpiece, a reflectivity of the workpiece, and/or a topography of the workpiece. The beam parameter product, the numerical aperture, and/or the beam shape may be determined based at least in part on one or more directional changes in the processing path. At least one in-coupling location may at least partially overlap the first cladding. Beam energy in-coupled into the first cladding may form at least a portion of the output beam. At least one in-coupling location may at least partially overlap the first region and/or the second region. Beam energy in-coupled thereinto may form at least a portion of the output beam. Directing the laser beam onto one or more in-coupling locations on the input end of the optical fiber may include, consist essentially of, or consist of (i) reflecting the laser beam with one or more reflectors and/or (ii) focusing the laser beam with one or more optical elements. The one or more in-coupling locations may include, consist essentially of, or consist of a plurality of different in-coupling locations. While processing the workpiece, the beam parameter product, the numerical aperture, and/or the beam shape of the laser beam may be altered by directing the laser beam onto one or more second in-coupling locations different from the one or more in-coupling locations. The laser beam may be emitted from a beam emitter including, consisting essentially of, or consisting of (i) one or more beam emitters emitting a plurality of discrete beams, (ii) focusing optics for focusing the plurality of beams toward a dispersive element, (iii) the dispersive element for receiving and dispersing the received focused beams, and (iv) a partially reflective output coupler positioned to receive the dispersed beams, transmit a portion of the dispersed beams therethrough as the laser beam, and reflect a second portion of the dispersed beams back toward the dispersive element (and, e.g., thence to the beam emitter to stabilize the emission wavelengths thereof). The laser beam may be composed of multiple wavelengths. The dispersive element may include, consist essentially of, or consist of a diffraction grating (e.g., a transmissive diffraction grating or a reflective diffraction grating).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other. Distances utilized herein may be considered to be "optical distances" unless otherwise specified.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
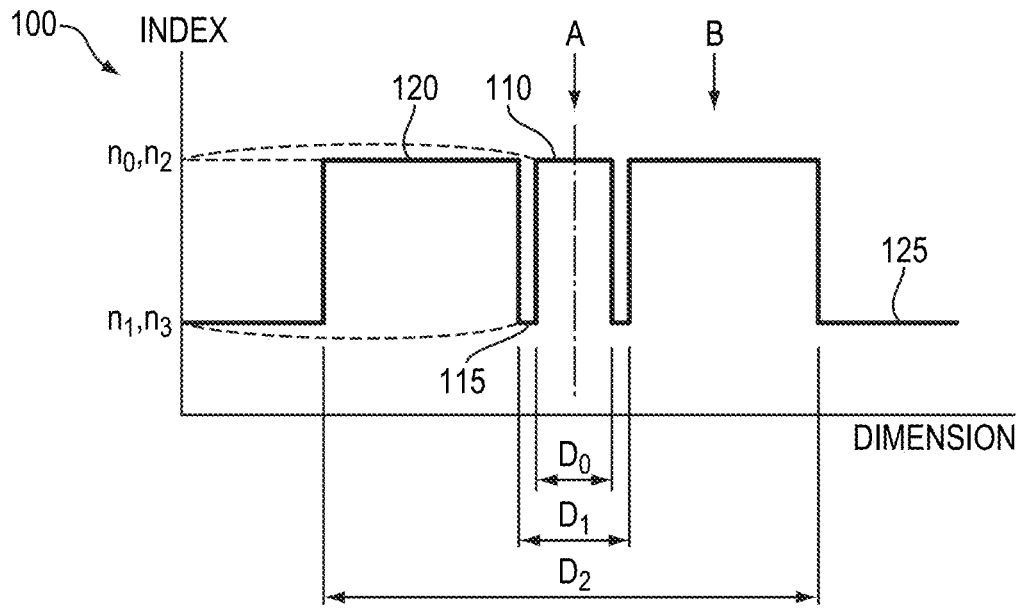
FIG. 1A is a schematic diagram of refractive indices of the various layers of a conventional double-clad optical fiber.
Figure 1B:
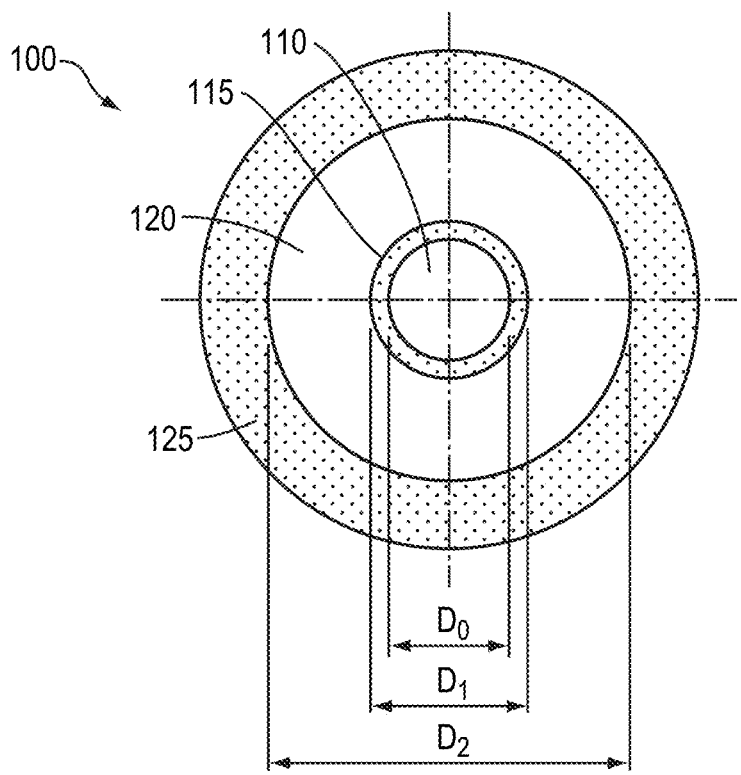
FIG. 1B is a schematic cross-section of the optical fiber of FIG. 1A.

FIGS. 1A and 1B depict a conventional double-clad fiber 100 having a center core 110 with a diameter $D_0$ and a refractive index $n_0$, an interior cladding 115 with a diameter $D_1$ and a refractive index $n_1$, an annular core 120 with a diameter $D_2$ and a refractive index $n_2$, and an exterior cladding 125 with a refractive index $n_3$. As shown, refractive index $n_2$ is equal to refractive index $n_0$, and refractive index $n_3$ is equal to refractive index $n_1$. Therefore, the center core 110 and the annular core 120 have the same NA, equal to sqrt($n_0^2-n_1^2$). FIG. 1A depicts the refractive index of fiber 100 across the diameter of the fiber, and FIG. 1B is a schematic cross-section of the fiber 100 itself.

Double-clad fiber 100 is typically utilized by coupling a laser beam into either or both of the locations A and B indicated on FIG. 1A; that is, the laser beam may be coupled into the center core 110 and/or the annular core 120. Systems utilizing fiber 100 thus vary BPP of the output beam by varying the effective spot size at the exit of the fiber 100, and the output NA is unchanged. Using fiber 100, the shape of the output beam is restricted to a central spot (when all laser power is coupled into location A), an annular ring (when all laser power is coupled into location B), or a mix of the two (when the laser power is coupled into locations A and B).

Significantly, laser power coupled into the interior cladding 115 will typically be lost completely. Power coupled into interior cladding 115, which is conventionally quite thin, will spread into the exterior cladding 125 and be removed by a mode stripper, fiber cables for high-power laser delivery typically having mode strippers to remove radiation from the exterior cladding. As mode strippers can only handle limited levels of laser power, excess power in the exterior cladding 125 can easily damage the mode stripper and then the fiber itself. In fibers without mode strippers, power coupled into interior cladding 115 will become non-zero large-diameter background radiation at the fiber output. Such background power may damage downstream optics and is typically ineffective output power and may even be deleterious in many applications. Finally, large amounts of power extending to the exterior cladding may result in fiber burning, as the exterior cladding is typically surrounded by one or more plastic coatings.

Thus, laser systems utilizing fiber 100 will avoid continuous shifting of laser power between locations A and B (i.e., traversing the interior cladding 115 with the laser beam powered), and such laser systems typically utilize either two different lasers (i.e., one each for locations A and B) or a complex variable-power optical splitting system to allocate laser power between locations A and B without illuminating the interior cladding 115.

Figure 2:
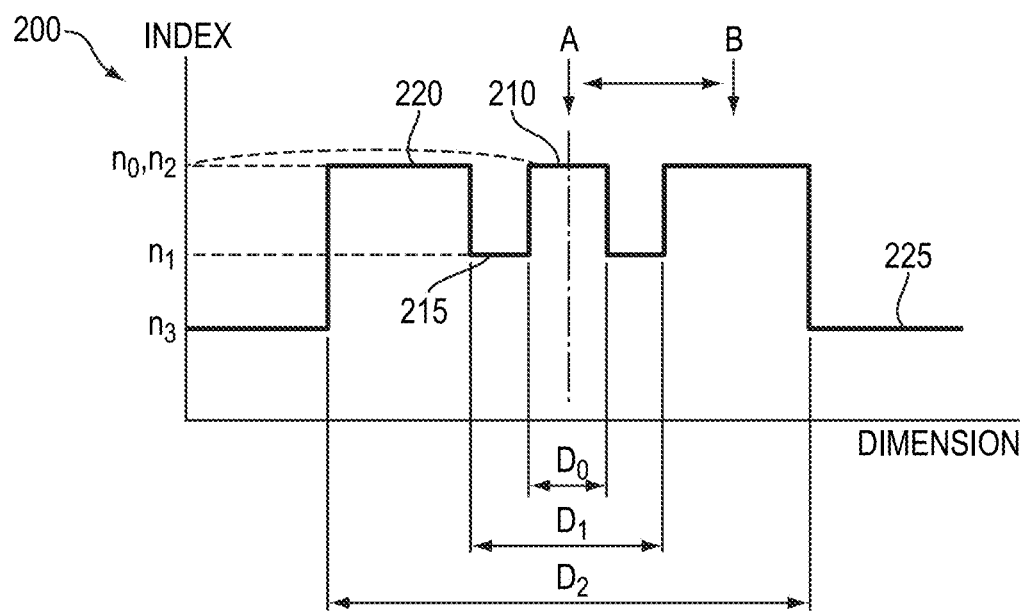
FIG. 2 is a schematic diagram of refractive indices of the various layers of a conventional step-clad optical fiber.

FIG. 2 depicts the corresponding structure of a conventional step-clad optical fiber 200, as detailed in U.S. Pat. No. 10,088,632, filed on Apr. 5, 2017 (the '632 patent), the entire disclosure of which is incorporated by reference herein. As shown, fiber 200 features a center core 210 having a diameter $D_0$ and a refractive index $n_0$, a first cladding 215 with a diameter $D_1$ and a refractive index $n_1$, an annular core 220 with a diameter $D_2$ and a refractive index $n_2$, and an exterior cladding 225 with a refractive index $n_3$. In the embodiment shown, refractive index $n_2$ is equal to refractive index $n_0$, and refractive index $n_3$ is less than refractive index $n_1$. As detailed in the '632 patent, fiber 200 may be utilized for shaping of an output laser beam more dynamically than fiber 100. For example, in addition to enabling in-coupling of laser energy into the center core 210 and/or the annular core 220, fiber 200 also enables all or a portion of the laser power to be in-coupled into the first cladding 215.

Specifically, laser power coupled into the first cladding 215 will not be lost, and such energy will typically spread over into the whole area from the center of the fiber 200 (i.e., within the center core 210) to the outside boundary of the annular core 220 (i.e., up to the interface between the annular core 220 and the exterior cladding 225). Laser beams initially coupled into the first cladding 215 but exiting from the center core 210 and the annular core 220 will have output $NA_{out}$ larger than the input $NA_{in}$, calculated by $NA_{out}=\mathrm{sqrt}(NA_{in}^2+(n_0^2-n_1^2))$. The contribution of this enlarged NA to the overall output NA will be dependent on the percentage of the power coupled into the first cladding 215 and also on the ratio of the cross-sectional area of the first cladding 215 to the a real sum of the center core 210 and the annular core 220. In addition, in order to avoid laser energy leakage into the exterior cladding 225, the laser input $NA_{in}$ utilized with fiber 200 will typically be smaller than the NA of the first cladding 215, which is equal to sqrt($n_1^2-n_3^2$)).

Compared to fiber 100, fiber 200 provides various advantages for beam shaping. For example, systems utilizing fiber 200 vary BPP of the beam by varying both the effective spot size and the NA at the fiber exit without changing the input NA. In addition, compared to fiber 100, fiber 200 provides a larger range of BPP variation for the same center core and annular core diameters. Fiber 200 also enables the formation of additional beam shapes due to its acceptance of laser power into first cladding 215. Finally, input laser beam energy may be continuously shifted between the center core 210 and the annular core 220, traversing the first cladding 215; therefore, systems utilizing fiber 200 do not need dual input lasers or complicated laser-power splitting systems for the input laser beam.

Figure 3:
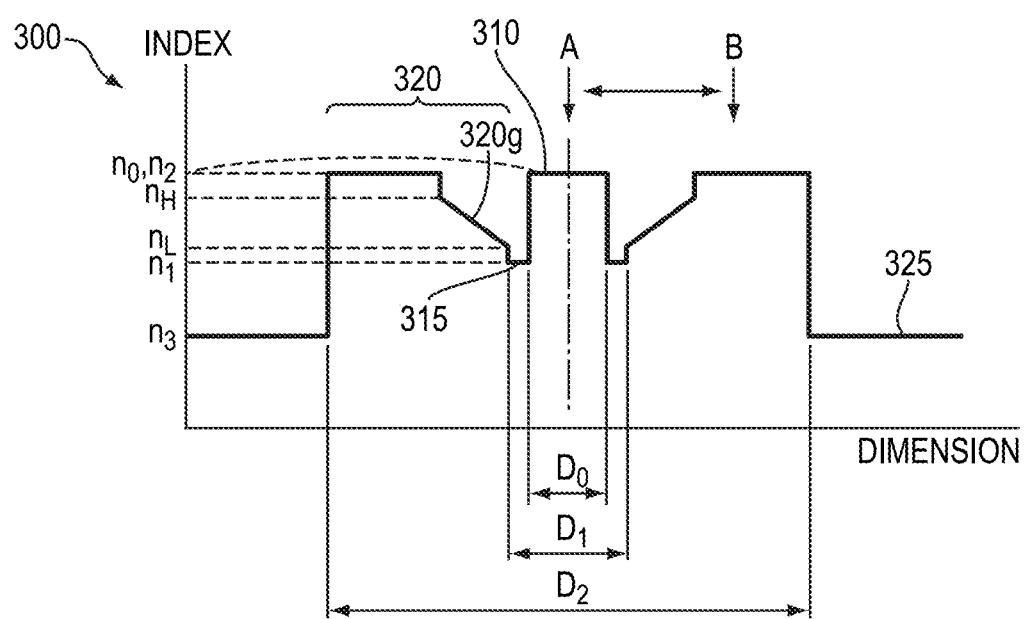
FIG. 3 is a schematic diagram of refractive indices of the various layers of an optical fiber in accordance with various embodiments of the invention.

While step-clad optical fiber 200 presents many advantages over a conventional dual-core fiber 100, embodiments of the invention provide additional advantages not enabled by the conventional step-clad fiber 200. FIG. 3 depicts the interior structure of a gradient step-clad optical fiber 300 in accordance with embodiments of the present invention. As shown, fiber 300 features a center core 310 having a diameter $D_0$ and a refractive index $n_0$, a first cladding 315 with a diameter $D_1$ and a refractive index $n_1$, an annular core 320 with a diameter $D_2$, and an exterior cladding 325 with a refractive index $n_3$. Similar to the step-clad fiber 200 shown in FIG. 2, the first cladding 315 may have an intermediate index of refraction $n_1$, which is smaller than refractive index $n_0$ and larger than refractive index $n_3$. In various embodiments, the difference between $n_0$ and $n_1$ determines the NA of the center core 310, calculated by $NA_{core}=\mathrm{sqrt}(n_0^2-n_1^2)$, and the difference between no and $n_3$ determines, at least in part, the overall NA of the fiber 300, calculated by $NA_{fiber}=\mathrm{sqrt}(n_0^2-n_3^2)$. Since $n_1$ is larger than $n_3$, $NA_{fiber}$ is larger than $NA_{core}$.

In various embodiments, the annular core 320 includes, consists essentially of, or consists of two different regions. As shown in FIG. 3, the annular core 320 may feature a graded-index region 320g and a constant-index region having a refractive index $n_2$. In the graded-index region 320g, the refractive index varies between a low refractive index $n_L$ and a high refractive index $n_H$. In various embodiments, the low refractive index $n_L$ may be approximately equal to or higher than the refractive index $n_1$ of the first cladding 315, and the high refractive index $n_H$ may be approximately equal to or lower than the refractive index $n_2$ of the constant-index region. In various embodiments, $n_2$ may be approximately equal to $n_0$, as shown in FIG. 3. In other embodiments, $n_2$ may be larger or smaller than $n_0$. These relationships between $n_2$ and no may apply to any of the optical fibers in accordance with embodiments of the invention detailed herein.

In accordance with various embodiments of the invention, the diameters of core and cladding regions may depend at least in part on various properties (e.g., output power) of the laser source and/or on the desired BPP range of the output beam to be transmitted by the optical fiber. For example, a center core diameter $D_0$ of approximately 100 µm, matched with a laser source having a BPP of about 3.5 mm-mrad, will typically result in a relatively low output NA (approximately 0.09) with a minimum BPP of approximately 4 mm-mrad. Continuing the example, if the desired BPP variation range is about a factor of 6, the diameter $D_2$ of the annular core 320 may be approximately 600 µm, not considering NA enlargement that may occur when some laser power is in-coupled into the first cladding 315 and/or into a portion (e.g., the lower-index portion) of the graded-index region 320g. Assuming the NA of the center core 310 is approximately 0.12 and the laser input NA is approximately 0.085, the enlarged NA will be approximately 0.147 (=sqrt(0.12×0.12+ 0.085×0.085)), which is larger than the input NA by a factor of 1.7. As mentioned, the effective enlargement of the overall output NA may be smaller than this factor of 1.7 because, in various embodiments, not all of the input power is coupled into low-index regions or exits from high-index regions. Assuming that the overall NA enlargement is approximately 1.5, then the annular core diameter may be reduced to approximately 400 µm to achieve the same desired range of BPP variation. A smaller diameter of the annular core may result in higher intensity of the output beam, which may be beneficial in many high-power laser applications. In various embodiments, the ratio of the diameter $D_2$ to the diameter $D_0$ ranges from approximately 2.5 to approximately 8, or approximately 3 to approximately 6. This ratio may be applied to all different optical-fiber embodiments detailed herein.

In various embodiments, the thickness of the first cladding 315 (i.e., $((D_1-D_0)/2)$) may be less than approximately one-half of the diameter $D_0$ (i.e., less than approximately $D_0/2$). This thickness of the first cladding may be applied to all different optical-fiber embodiments detailed herein. For optical fiber 300, the thickness of the first cladding 315 may be even smaller, e.g., less than approximately 25%, less than approximately 10%, or even less than approximately 5% of the diameter Do, due to, e.g., the presence of the lower-index portion of the graded-index region 320g.

Advantageously, laser energy coupled into the refractive-index profile of the annular core 320, including the graded-index region 320g, will result in output beams having annular beams with different effective diameters and widths, depending upon the input location in annular core 320. In various embodiments, the graded-index region 320g provides and enables different critical-angle interface locations of total internal reflection of input beams having different NAs. For example, laser power with an input NAin in-coupled into the constant-index region of annular core 320 will typically not spread within the entire annular core 320, but will rather be contained within a more limited area having a refractive index larger than $n_x$ (which is greater than $n_1$) that satisfies $sqrt(n_2^2-n_x^2)=NAin$. In other words, the portion of annular core 320 having refractive index $n_x$ acts as a ray stopper. Similarly, different portions of the input power in the NA domain will have different input NA ranging from 0 to NAin, and these different portions will therefore be "blocked" by different portions (i.e., cylindrical "interfaces") within the annular core 320. In general, a z-portion of power having an input NAz (which is less than or equal to NAin) in-coupled into the annular core 320 at position y having a relatively high refractive index $n_y$ will be confined within a volume in the annular core 320 having refractive index larger than $n_x$ and that satisfies $sqrt(n_y^2-n_x^2)=NAz$. This equation applies to all the embodiments of the invention. This general proposition may be applied to any and all different embodiments of the invention detailed herein.

In various embodiments, compared to the conventional step-clad optical fiber 200 depicted in FIG. 2, the gradient step-clad optical fiber 300 provides a wider variety of beam shapes and may therefore be deployed to meet the requirements of a wider variety of applications and workpieces processed by its output beams. As the general equation described above indicates, changes of input location (y) will typically result in different annular rings in the output beam having different cross-sectional profiles in intensity and width. Changes in input location may also generate annular rings of different effective diameters, particularly if the gradient-index region 320g is disposed at or near the outer edge of the annular core 320. Conventional fibers (e.g., optical fiber 200) will not exhibit such dynamics because laser power in-coupled into the annular core region of such fibers will spread nearly evenly over the entire annular core region.

In addition, as indicated by the double-headed arrow between locations A and B in FIG. 3, the gradient step-clad optical fiber 300 enables the laser input spot to be continuously shifted from location A to location B without appreciable loss of power, given that the laser input $NA_{in}$ is not larger than the NA of the first cladding 315, which is equal to $sqrt(n_1^2-n_3^2)$.

In various embodiments, the refractive-index profile (i.e., the variation of the refractive index as a function of position) of the graded-index region 320g may be a substantially linear gradient, as shown in FIG. 3. In other embodiments, the profile may have other shapes, including parabolic, root-square, polynomial, stepped (i.e., composed of discrete steps in refractive index), or any other monotonic curve. In various embodiments, the graded-index region 320g may be disposed between first cladding 315 and the constant-index region of annular core 320, as shown in FIG. 3. In other embodiments, the graded-index region 320g may instead be disposed between the constant-index region and the exterior cladding 325, or graded-index regions may be disposed on both sides of the constant-index region. In such embodiments, the refractive index of the constant-index region may be between $n_0$ and $n_1$ depicted in FIG. 3.

In various embodiments, the annular cladding 320 may entirely consist of the graded-index region 320g; that is, the width of the constant-index region of annular cladding 320 may be approximately zero. In addition or instead, the graded-index region 320g may extend such that it interfaces with the center core 310, i.e., the width of the first cladding 315 may be approximately zero. In various embodiments, the refractive index $n_2$ and/or $n_H$ within the annular core 320 may be smaller, larger, or approximately equal to $n_0$, i.e., the refractive index of the center core 310. Finally, although not depicted in FIG. 3, the gradient step-clad optical fiber 300 may also include one or more additional cladding layers disposed outside the exterior cladding 325. Such claddings (which may include, consist essentially of, or consist of, for example, coating layers) may be primarily protective in nature and thus may not directly transmit laser energy therewithin. The refractive indices of such layers may be lower than $n_3$, the refractive index of exterior cladding 325. In other embodiments, the refractive indices of such layers may be higher than $n_3$. In various embodiments, optical fibers have an outer glass layer having approximately the same refractive index as that of the center core directly surrounding the exterior cladding 325, and then one or more (e.g., one or two) coating layers disposed thereover, each having a refractive index lower than $n_3$.

Figure 4:
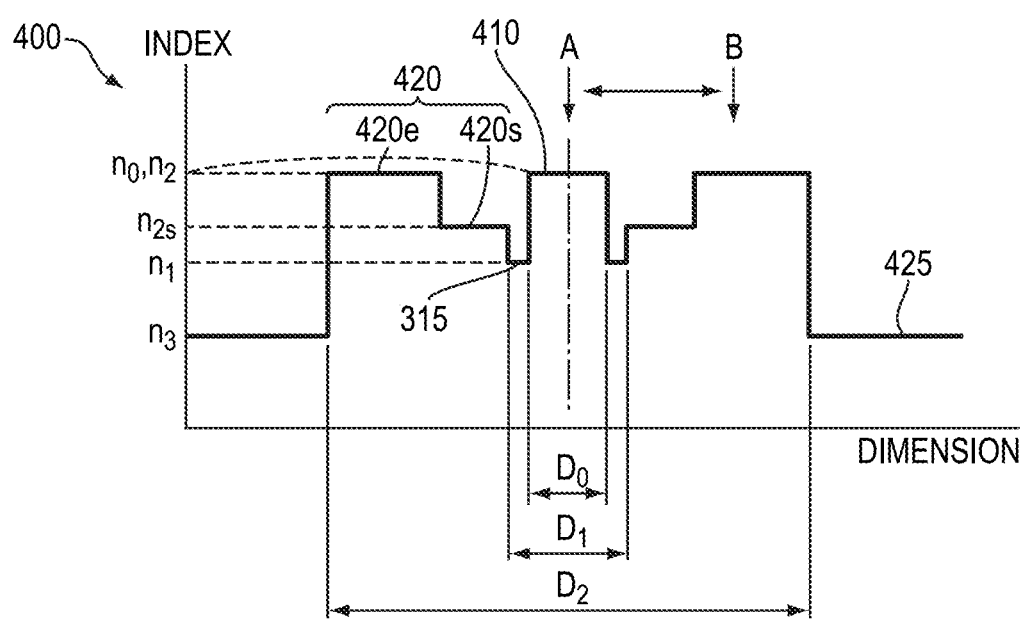
FIG. 4 is a schematic diagram of refractive indices of the various layers of an optical fiber in accordance with various embodiments of the invention.

FIG. 4 depicts the interior structure of another optical fiber according to embodiments of the present invention. As shown, multi-step clad optical fiber 400 features a center core 410 having a diameter $D_0$ and a refractive index $n_0$, a first cladding 415 with a diameter $D_1$ and a refractive index $n_1$, an annular core 420 with a diameter $D_2$, and an exterior cladding 425 with a refractive index $n_3$. Similar to fiber 300 shown in FIG. 3, the first cladding 415 may have an intermediate index of refraction $n_1$, which is smaller than refractive index $n_0$ and larger than refractive index $n_3$.

In various embodiments, the annular core 420 includes, consists essentially of, or consists of two different regions. As shown in FIG. 4, the annular core 420 may feature an interior step-index region 420s having a refractive index $n_{2s}$ and an exterior step-index region 420e having a refractive index $n_2$. In various embodiments, the refractive index $n_{2s}$ is larger than refractive index $n_1$ of the first cladding 415 and smaller than refractive index $n_2$. In accordance with various embodiments of the invention, laser power coupled into the exterior step-index region 420e will primarily remain within the exterior step-index region 420e, and power coupled into the interior step-index region 420s will be primarily contained within both regions 420s, 420e; therefore, laser energy coupled into either or both of these regions will result in output beams having annular beams with different effective diameters and widths, depending upon the input location in annular core 420 (similar to the discussion regarding fiber 300 above).

For multi-step clad optical fiber 400, in accordance with various embodiments, the thickness of interior step-index region 420s may be greater than or equal to approximately 10% of the center core diameter $D_0$, or even greater than or equal to approximately 25% of $D_0$. Such values may be applied to the thickness of the first cladding 415 as well. In various embodiments, the thickness of one or more layers of the optical fiber depends on the center-core diameter $D_0$ because the spot size of the input laser beam may be, for example, approximately 60% to approximately 90% of $D_0$.

In various embodiments, compared to the conventional step-clad optical fiber 200 depicted in FIG. 2, the multi-step clad optical fiber 400 provides a wider variety of beam shapes and may therefore be deployed to meet the requirements of a wider variety of applications and workpieces processed by its output beams. For example, multi-step clad optical fiber 400 provides two discrete regions 420s, 420e within the annular core 420 for receiving laser-energy input and that will respectively result in different annular ring profiles not obtainable with conventional fibers such as fiber 200. In various embodiments, the presence of discrete regions 420s, 420e enables the manipulation of an annular-ring profile (e.g., intensity and/or width) via changes in the input power ratios between the two sections.

In various embodiments, the annular core 420 may include, consist essentially of, or consist of more than two different regions having different refractive indices. In addition, in various embodiments, the refractive index $n_{2s}$ of the exterior step-index region 420e may be larger than refractive index $n_{2s}$ of the interior step-index region 420s, as shown in FIG. 3, or $n_2$ may be smaller than $n_{2s}$.

Figure 5A:
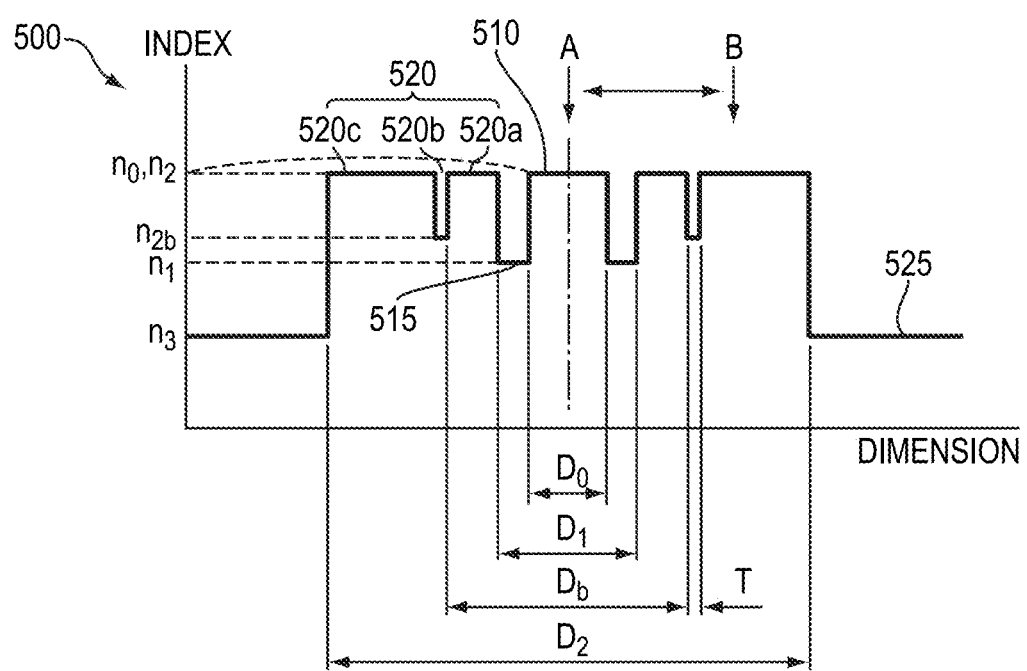
FIG. 5A is a schematic diagram of refractive indices of the various layers of an optical fiber in accordance with various embodiments of the invention.

FIG. 5A depicts the interior structure of another optical fiber according to embodiments of the present invention. As shown, barrier step-clad optical fiber 500 features a center core 510 having a diameter $D_0$ and a refractive index $n_0$, a first cladding 515 with a diameter $D_1$ and a refractive index $n_1$, an annular core 520 with a diameter $D_2$, and an exterior cladding 525 with a refractive index $n_3$. Similar to fibers 300 and 400, the first cladding 515 may have an intermediate index of refraction $n_1$, which is smaller than refractive index $n_0$ and larger than refractive index $n_3$.

In various embodiments, the annular core 520 includes, consists essentially of, or consists of three different regions. As shown in FIG. 5A, the annular core 520 may feature an inner region 520a, an outer region 520c, and a barrier region 520b disposed between regions 520a, 520c. In various embodiments, the refractive indices of both regions 520a, 520c are equal to refractive index $n_2$, which may be approximately equal to the refractive index $n_0$ of the center core 510. In other embodiments, $n_2$ may be greater than or less than $n_0$. The refractive index $n_{2b}$ of the barrier region 520b is smaller than $n_2$, and may be larger than or approximately equal to the refractive index $n_1$ of the first cladding 515. As shown in FIG. 5A, the barrier region 520b may have an inner diameter $D_b$, which is larger than the diameter $D_1$ of the first cladding 515, and a layer thickness T. In various embodiments, the layer thickness T of the barrier region 520b is less than approximately 30 µm, less than approximately 20 µm, or less than approximately 10 µm. The layer thickness T may be greater than approximately 1 µm, greater than approximately 2 µm, greater than approximately 5 µm, or greater than approximately 10 µm.

In various embodiments of the invention, the barrier region 520b, together with the first cladding 515 and the exterior cladding 525, will substantially stop laser power from spreading over to other regions of fiber 500 when the power is initially coupled into either the inner region 520a or the outer region 520c; therefore, output beams in accordance with embodiments of the invention may feature two discrete annular rings at the fiber exit. That is, fiber 500 enables the formation of output beams having two annular rings with different output intensities via distribution of input laser power between regions 520a, 520c. Such output beams are typically not enabled via the use of fibers 100, 200 detailed above. Moreover, laser power in-coupled into the barrier region 520b will typically not be lost from the output beam but will instead spread throughout the annular core 520.

In various embodiments, of the invention, laser power coupled into the first cladding 515 will tend to spread over to the entire annular core region 520, and such power may also spread over to the center core 510.

Thus, coupling beam energy into the first cladding 515 may result in a larger effective beam size at the fiber exit than coupling into inner region 520a. Thus, in embodiments of the invention a non-monotonic increase in output beam size results as the laser energy is coupled into the various regions of fiber 500, resulting in dynamic BPP variations not enabled via use of fibers 100, 200.

In various embodiments of the invention, the annular core region 520 may include more than one barrier region 520b, and each barrier region may have a different thickness and/or a different refractive index, although the refractive indices of such barrier layers are typically smaller than refractive index $n_2$ and larger than or approximately equal to refractive index $n_1$. That is, the annular core region 520 may be divided into N+1 regions (e.g., regions 520a, 520c) by N barrier regions 520b. The thickness and/or refractive index of two or more (or even all) of the multiple barrier regions 520b may be equal to each other or different from each other.

Figure 5B:
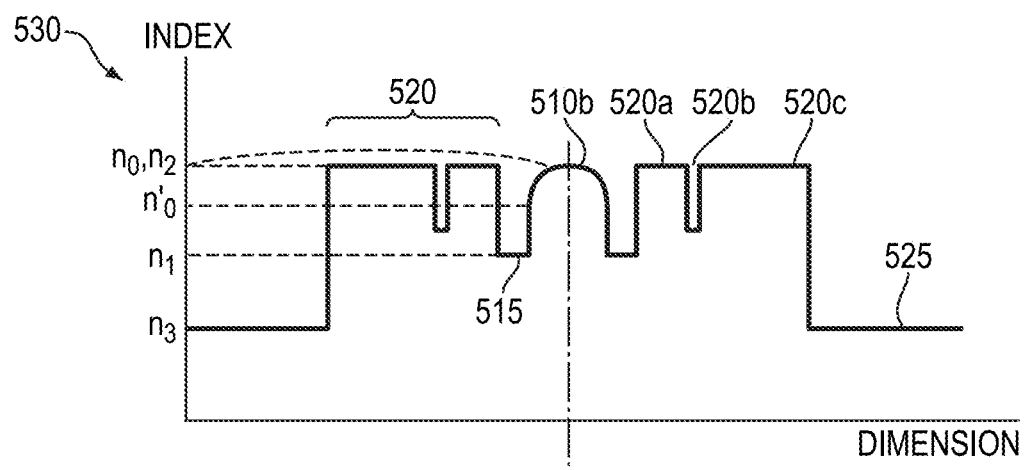
FIG. 5B is a schematic diagram of refractive indices of the various layers of an optical fiber in accordance with various embodiments of the invention.

FIG. 5B depicts the interior structure of an optical fiber according to embodiments of the present invention that is a variant of barrier step-clad optical fiber 500 depicted in FIG. 5A. As shown, barrier step-clad optical fiber 530 features a center core 510*b*, first cladding 515, annular core 520, and exterior cladding 525. Similar to fibers 300, 400, and 500, the first cladding 515 may have an intermediate index of refraction $n_1$, which is smaller than refractive index $n_0$ and larger than refractive index $n_3$.

As shown in FIG. 5B, center core 510*b* has a gradient-index profile, in which the center point of center core 510*b* has the highest refractive index $n_0$, and the refractive index of center core 510*b* decreases as a function of radial distance away from the center point. In various embodiments, only the center point of the center core 510*b* has the highest refractive index $n_0$, while in other embodiments, center core 510*b* has a central portion having a finite thickness and having the highest refractive index $n_0$. (That is, the refractive index of the center core 510*b* may plateau over a central portion and then decrease toward the outer perimeter of center core 510*b*.) The decrease in the refractive index of center core 510*b* may be substantially linear, parabolic, or may have a polynomial dependence. In other embodiments, the refractive index of center core 510*b* may decrease in a series of one or more (or even two or more) discrete steps. In various embodiments, the refractive index of center core 510*b* decreases to a refractive index $n'_0$ at the interface between center core 510*b* and first cladding 515. As shown, the refractive index $n'_0$ may be larger than the refractive index $n_1$ of the first cladding 515. In other embodiments, the refractive index $n'_0$ may be approximately equal to the refractive index $n_1$ of the first cladding 515.

As with optical fiber 500 of FIG. 5A, in various embodiments of the invention, the annular core region 520 of fiber 530 may include more than one barrier region 520*b*, and each barrier region may have a different thickness and/or a different refractive index, although the refractive indices of such barrier layers are typically smaller than refractive index $n_2$ and larger than or approximately equal to refractive index $n_1$.

Figure 6:
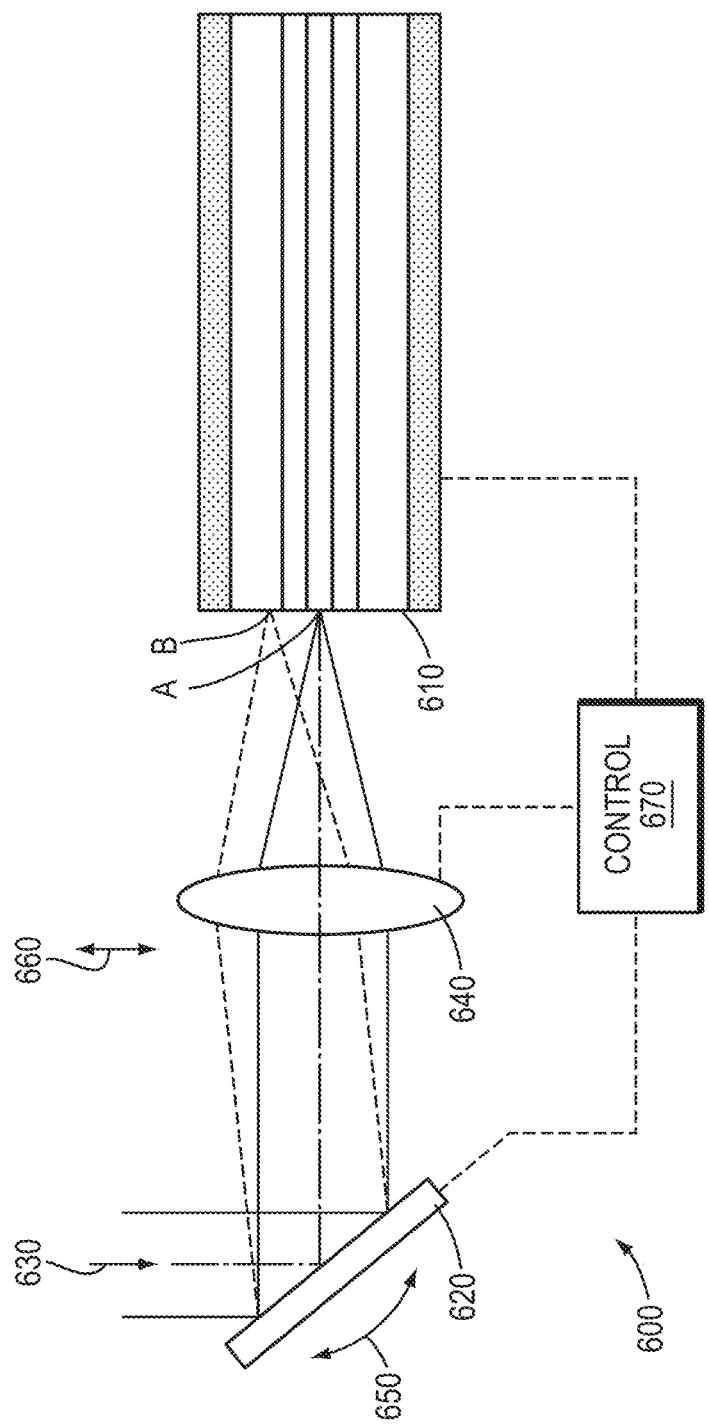
FIG. 6 is a schematic diagram of portions of a laser system utilizing an optical fiber in accordance with embodiments of the invention.

An exemplary laser system 600 for varying BPP using a fiber 610 in accordance with embodiments of the invention is depicted in FIG. 6. As shown, the laser system 600 includes a steering mechanism such as an adjustable reflector 620 (e.g., a tip-tilt adjustable and/or folding mirror) to redirect an incoming input laser beam 630 to a fiber coupling optical element 640 (e.g., one or more lenses, reflective wedges, and/or prisms), which focuses the beam 630 toward the fiber 610. The adjustment or tilt of the reflector 630 is indicated by curved arrow 650. As shown, the region of the input face of the fiber 610 at which the beam 630 is in-coupled may be at least partially defined by the configuration (e.g., the position and/or angle) of the reflector 620, and/or the adjustment of the location of the optical element 640 (which may be translated within the path of the beam 620 as indicated by arrow 660). Instead or in addition, the fiber 610 may itself be translated in a direction substantially parallel and/or substantially perpendicular to the longitudinal axis of the fiber 610. For the best starting beam quality (i.e., the smallest BPP), the input face of fiber 610 may be located at the focal spot of the optical element 640 (i.e., at a distance away from the optical element 640 equal to its focal length). However, in various embodiments, the optical element 640 and/or the fiber 610 may be translated longitudinally (e.g., in the direction along the long axis of the fiber 610 depicted in FIG. 6) so that the input face of fiber 610 is disposed at a distance less than or greater than the focal length of the optical element 640. In various embodiments of the invention, the fiber 610 may include, consist essentially of, or consist of any of the fibers 300, 400, 500, 530 detailed herein.

Various embodiments of the invention may utilize steering mechanisms other than flexure-mounted reflector 620, for example, flexure-mounted and/or actuated optical elements such as lenses and/or prisms. Thus, references to reflector 620 herein are understood to encompass such non-reflective variants (and variants including both a reflector and one or more other optical elements).

The configuration of the reflector 620 and/or the optical element 640 and/or the fiber 610 may be controlled via a controller 670 and/or one or more actuators (not shown) operatively connected thereto. Thus, the reflector 620 and/or the optical element 640 and/or the fiber 610 and/or the one or more actuators may be responsive to the controller 670. The controller 670 may be responsive to a desired target radiation power distribution and/or BPP or other measure of beam quality (e.g., input by a user and/or based on one or more properties of a workpiece to be processed such as the distance to the workpiece, the composition of the workpiece, topography of the workpiece, etc.) and configured to position reflector 620 and/or the optical element 640 and/or the fiber 610 to cause the beam 630 to strike the input face of the fiber 610 such that the output beam output from the fiber 610 has the target radiation power distribution or beam quality. The output beam thus produced may be directed to a workpiece for processes such as annealing, cutting, welding, drilling, etc. The controller 670 may be programmed to achieve the desired power distribution and/or output BPP and/or beam quality via, e.g., a particular reflector tilt and/or position (and/or tilt) of optical element 640 and/or fiber 610 as detailed herein.

Thus, in various embodiments of the invention, the beam source, the reflector 620, the fiber 610, and/or the optical element 640 may be responsive to the controller 670. The output end of the optical fiber 610 (i.e., the end of the fiber opposite the input end receiving the beam 630) may have coupled thereto a laser head for directing the output beam toward a workpiece to be processed. The laser head may include, consist essentially of, or consist of one or more optical elements for focusing and/or collimating the output beam, and/or controlling the polarization and/or the trajectory of the beam. The laser head may be positioned to emit the output beam toward a workpiece and/or toward a platform or positionable gantry on which the workpiece may be disposed.

In various embodiments, the controller 670 may initiate processes performed using the output beam (and/or the laser head) and position the beam 630 relative to the fiber 610 at one or more different in-coupling locations accordingly. In various embodiments, the controller 670 may even control the motion of the fiber 610 and/or the laser head relative to the workpiece via control of, e.g., one or more actuators. The controller 670 may also operate a conventional positioning system configured to cause relative movement between the output laser beam and the workpiece being processed. For example, the positioning system may be any controllable optical, mechanical or opto-mechanical system for directing the beam through a processing path along a two- or three-dimensional workpiece. During processing, the controller 670 may operate the positioning system and the laser system 600 so that the laser beam traverses a processing path along the workpiece. The processing path may be provided by a user and stored in an onboard or remote memory, which may also store parameters relating to the type of processing (cutting, welding, etc.) and the beam parameters (e.g., beam shape and/or BPP) necessary or desired to carry out that processing. In this regard, a local or remote database may maintain a library of materials and thicknesses that the system will process, and upon user selection of material parameters (type of material, thickness, etc.), the controller 670 queries the database to obtain the corresponding beam properties and determines the proper in-coupling location(s) of beam 630 into fiber 610. The stored values may include beam properties suitable for various processes of the material (e.g., piercing, cutting, etc.), the type of processing, and/or the geometry of the processing path.

As is well understood in the plotting and scanning art, the requisite relative motion between the output beam (and/or the laser head) and the workpiece may be produced by optical deflection of the beam using a movable mirror, physical movement of the laser using a gantry, lead-screw or other arrangement, and/or a mechanical arrangement for moving the workpiece rather than (or in addition to) the beam. The controller 670 may, in some embodiments, receive feedback regarding the position and/or processing efficacy of the beam relative to the workpiece from a feedback unit, which will be connected to suitable monitoring sensors.

Embodiments of the invention may enable a user to process (e.g., cut or weld) a workpiece along a desired processing path, and the properties of the output beam (e.g., beam shape, BPP, or both), power level of the output beam, and/or maximum processing speed are selected based on factors such as, but not limited to, the composition of the workpiece, the thickness of the workpiece, the geometry of the processing path, etc. For example, a user may select or preprogram the desired processing path and/or type (and/or other properties such as thickness) of the workpiece into the system using any suitable input device or by means of file transfer. Thereafter, the controller 670 may determine optimum output beam properties as a function of location along the processing path. In operation, the controller 670 may operate the laser system and positioning of the workpiece to process the workpiece along the preprogrammed path, utilizing the proper output beam properties for processes such as cutting or welding. If the composition and/or thickness of the material being processed changes, the location and nature of the change may be programmed, and the controller 670 may adjust the laser beam properties and/or the rate of relative motion between the workpiece and the beam accordingly.

In addition, the laser system may incorporate one or more systems for detecting the thickness of the workpiece and/or heights of features thereon. For example, the laser system may incorporate systems (or components thereof) for interferometric depth measurement of the workpiece, as detailed in U.S. patent application Ser. No. 14/676,070, filed on Apr. 1, 2015, the entire disclosure of which is incorporated by reference herein. Such depth or thickness information may be utilized by the controller 670 to control the output beam properties to optimize the processing of the workpiece, e.g., in accordance with records in the database corresponding to the type of material being processed.

The controller 670 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described herein. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C #, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

Figures 7A, 7B:
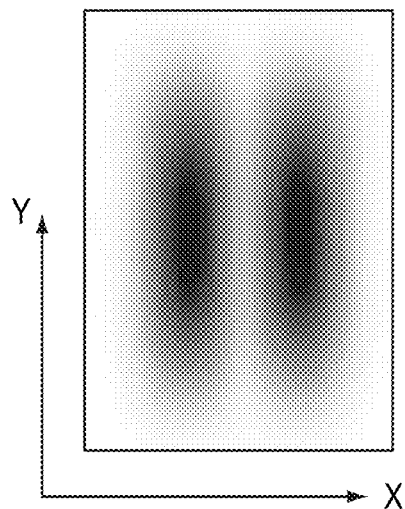
FIG. 7A is a schematic diagram of an exemplary input beam for a simulation demonstrating effects of various embodiments of the invention.
FIG. 7B is a table of exemplary fiber parameters for the simulation utilizing the input beam of FIG. 7A.

FIGS. 7A and 7B depict exemplary input beams and fiber parameters for a simulation demonstrating effects of various embodiments of the present invention. The numerical example is based on a system similar to that shown in FIG. 6 with a focusing lens (corresponding to optical element 640) having a focal length of 30 mm. FIG. 7A depicts the input laser beam in cross-section before the input beam strikes the optical element 640 in system 600. As shown, the input beam features two rectangular beams, which are identical to each other and aligned along the x axis. In the depicted example, the input laser beam was formed by spatial combining of two identical WBC resonator output beams (see FIG. 11). The individual beam full size at four sigma is about 1.5×5.6 (x×y) in mm. The overall BPP of the input laser beam is about 3×4 (x×y) in mm·mrad. The optical fiber 610 in the system 600 corresponds to fiber 500 depicted in FIG. 5A with the various fiber parameters listed in FIG. 7B.

Figure 8:
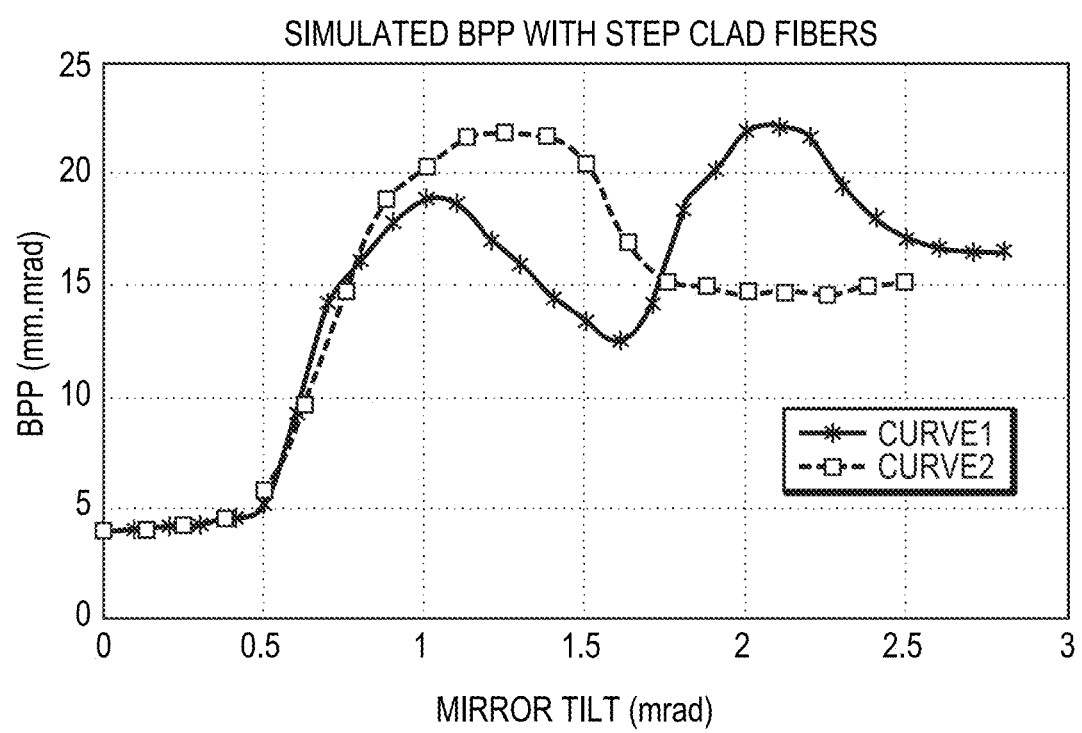
FIG. 8 is a graph of simulated beam parameter product, as a function of reflector tilt, for the simulation using the input beam and fiber parameters of FIGS. 7A and 7B, comparing the use of an optical fiber in accordance with embodiments of the invention with a conventional step-clad optical fiber.

FIG. 8 is a graph of the simulated BPP values of the example configuration of FIGS. 7A and 7B (Curve 1) as a function of the tilt angle of the reflector/mirror. For comparison, a second curve (Curve 2) is also displayed, which represents the simulated BPP when a conventional step-clad optical fiber 200 (see FIG. 2) is utilized. For Curve 2, the step-clad optical fiber 200 has diameters of 100 μm, 160 μm, and 360 μm for the center core, the first clad, and the annular core, respectively, and has similar refractive index values to those listed in FIG. 7B. In the simulations, the fiber-coupling system (FIG. 6) is aligned to have the input spot at the fiber center when the mirror tilt is zero. The off-center shift of the input beam spot is proportional to the mirror tilt, calculated by 2×f×θ, where f (equal to 30 mm in this example) is the focal length of the focusing lens (corresponding to optical element 640 in FIG. 6) and θ is the mirror tilt angle.

As shown in FIG. 8, the BPP variation of Curve 1 in accordance with embodiments of the invention has two humps (i.e., local maxima) while Curve 2 has only one. Curve 2 flattens out in the region beyond mirror tilts of approximately 2 mrad because, as discussed herein, input power coupled into the annular core 212 of optical fiber 200 will spread over the entire annular core 212, regardless of its input location.

The single hump in Curve 2 is primarily due to the NA enlargement resulting when the laser beam is initially coupled into a low-index region (the first cladding 215 in FIG. 2) but exits from high-index regions (e.g., the center core 210 and the annular core 220 in FIG. 2). The dual-hump feature of Curve 1, which results from the use of optical fiber 500, results from the combined effects of not only the NA enlargement but also the unique non-monotonic increase of the effective beam size at fiber exit with the increase in mirror tilt detailed above.

Figure 9A:
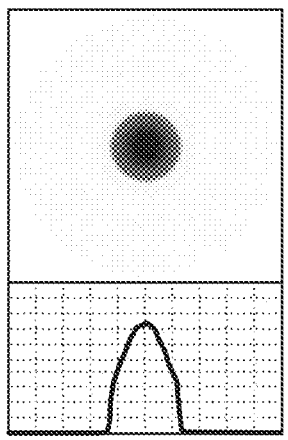
FIGS. 9A-9E are plan-view diagrams of laser beams emanating from the optical fiber in accordance with embodiments of the invention at different mirror tilts represented on the graph of FIG. 8.
Figure 9B:
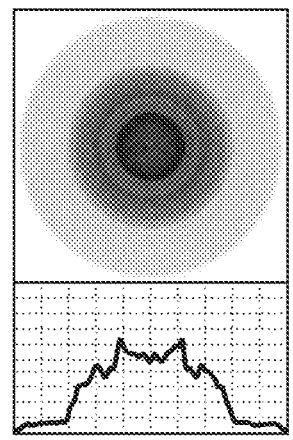
Figure 9C:
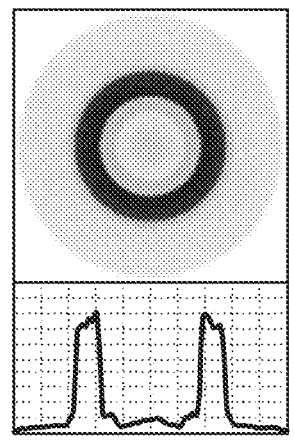
Figure 9D:
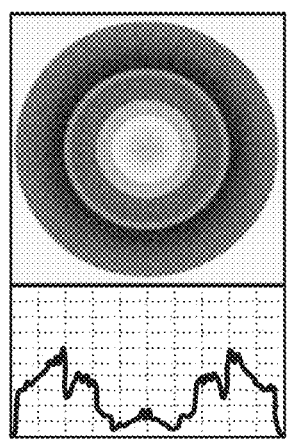
Figure 9E:
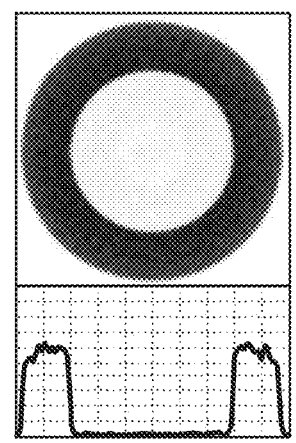

FIGS. 9A-9E depict five simulated beam images at fiber exit corresponding to the numerical example of FIGS. 7A, 7B, and 8 with different mirror tilts. The corresponding BPP values may be found on Curve 1 in FIG. 8 at the corresponding mirror tilts. Each of FIGS. 9A-9E also includes a cross-sectional profile of the beam at the fiber exit at the bottom of each image. FIG. 9A depicts the exit beam having the lowest BPP (approximately 4 mm·mrad) and in which all of the power exits from the center core of the optical fiber. FIG. 9B depicts the exit beam having the BPP reaching the first peak in Curve 1 of FIG. 8 (approximately 19 mm·mrad) as a significant portion of the laser power is initially coupled into the first cladding layer of the optical fiber (i.e., first cladding 515 in FIG. 5A). At a mirror tilt of 1.6 mrad, as shown in FIG. 9C, a significant portion of the input power is coupled into the annular core inner region (region 520a in FIG. 5A), which leads to a relatively small annular ring at the fiber exit. At a mirror tilt of 2.2 mrad, as shown in FIG. 9D, the output profile features dual annular rings and a BPP near the second peak in the graph of FIG. 8 (Curve 1). In this case, the input beam is near or approximately at the barrier 520b so that most of the power is coupled into both the inner and outer regions 520a, 520c. In addition, the clear non-zero power density at the center of the beam profile indicates that a portion of the power coupled into the barrier 520b exits from the center core 510. At a mirror tilt of 2.7 mrad, as shown in FIG. 9E, the input spot is shifted to the annular core outer region (i.e., region 520c in FIG. 5A), and therefore a larger annular ring is generated.

Figure 10A:
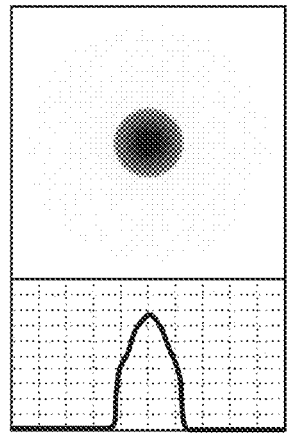
FIGS. 10A-10D are plan-view diagrams of laser beams emanating from the conventional step-clad optical fiber at different mirror tilts represented on the graph of FIG. 8.
Figure 10B:
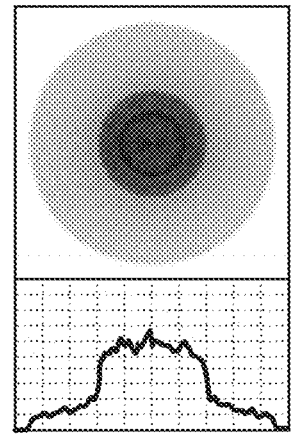
Figure 10C:
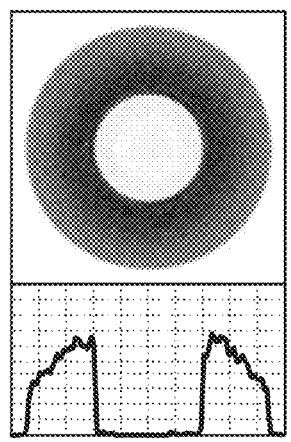
Figure 10D:
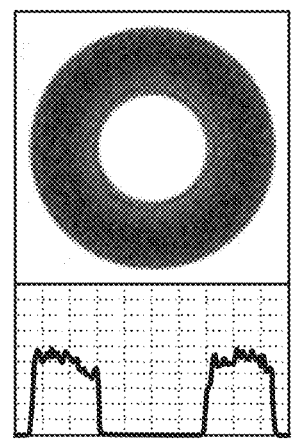

FIGS. 10A-10D depict four simulated beam images at fiber exit corresponding to the numerical example of FIG. 8 with different mirror tilts but utilizing the optical fiber 200. The corresponding BPP values may be found on Curve 2 in FIG. 8 at the corresponding mirror tilts. Each of FIGS. 10A-10D also includes a cross-sectional profile of the beam at the fiber exit at the bottom of each image. FIG. 10A depicts the exit beam having the lowest BPP (approximately 4 mm·mrad) and in which all of the power exits from the center core of the optical fiber, similar to FIG. 9A. FIG. 10B depicts the exit beam having the BPP reaching the peak in Curve 2 of FIG. 8 (approximately 22 mm·mrad), mainly due to NA enlargement when a significant power of the laser power is coupled into the first cladding 215 (see FIG. 2). FIGS. 10C and 10D illustrate how the output profile does not appreciably change with further mirror tilt above approximately 1.8 mrad, i.e., once the input spot is located outside of the first cladding as the majority of the power is in-coupled into the annular core 220. As compared with FIGS. 9C-9E, this behavior is quite different when compared to optical fibers in accordance with embodiments of the present invention.

Optical fibers in accordance with embodiments of the invention therefore provide more dynamic and varied variations of BPP, NA, and output beam size, and may therefore be deployed in a wider variety of applications and/or for processing of a wider variety of different workpieces. Fibers in accordance with embodiments of the invention enable the formation of output beams having one or more annular rings of varied diameters and/or widths, and they enable a wider variety of mixed beam shapes with different beam profiles and BPP values.

Laser system 600 may be utilized to alter the BPP, shape, and/or NA of a laser beam in a continuous fashion without the need to power down (i.e., switch off) the input laser beam as the beam is swept across the input face of the fiber such that different portions of the beam are in-coupled into different regions of the fiber. Because the fibers are configured such that beam energy propagating to a cladding region (e.g., the first cladding) is confined and will not lead to damage to the fiber or optics (e.g., optical elements) associated therewith, the input beam need not be switched off as it or a portion thereof strikes the cladding(s) of the optical fiber.

Figure 11:
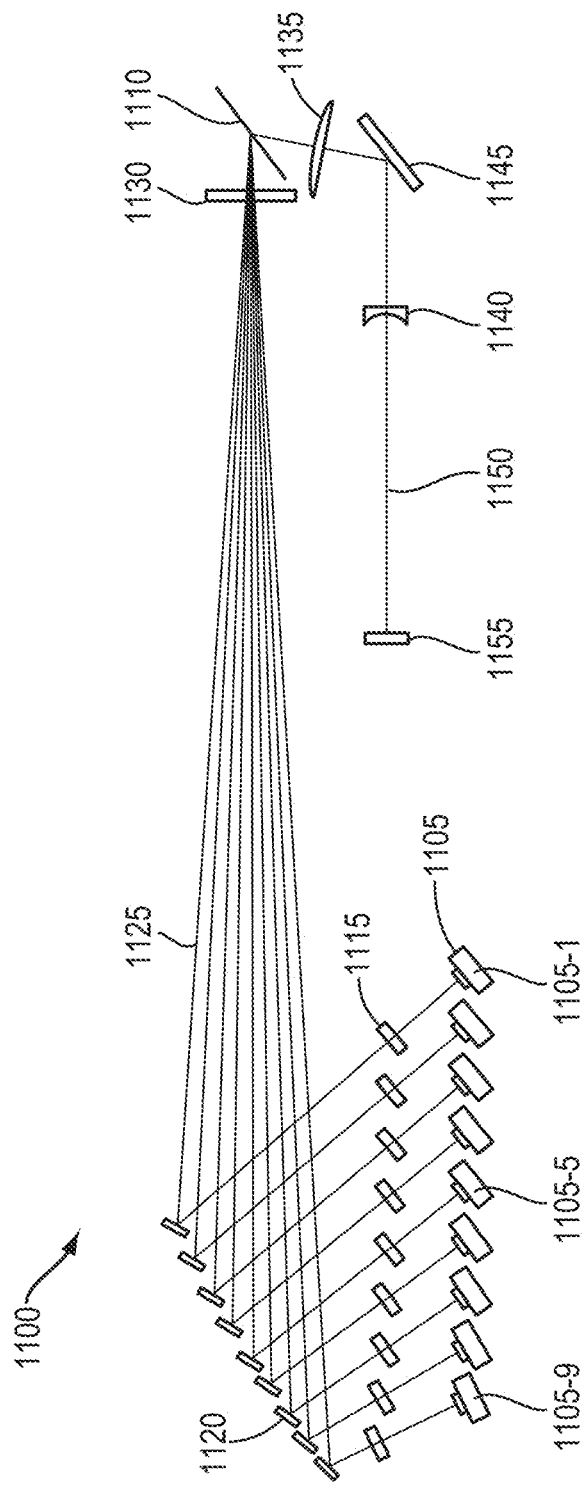
FIG. 11 is a schematic diagram of a wavelength beam combining (WBC) resonator in accordance with embodiments of the invention.

Laser systems and laser delivery systems in accordance with embodiments of the present invention and detailed herein may be utilized in and/or with WBC laser systems. Specifically, in various embodiments of the invention, multi-wavelength output beams of WBC laser systems may be utilized as the input beams for laser beam delivery systems for variation of BPP as detailed herein. FIG. 11 schematically depicts various components of a WBC laser system (or "resonator") 1100 that may be utilized to form input beams used in embodiments of the present invention. In the depicted embodiment, resonator 1100 combines the beams emitted by nine different diode bars (as utilized herein, "diode bar" refers to any multi-beam emitter, i.e., an emitter from which multiple beams are emitted from a single package). Embodiments of the invention may be utilized with fewer or more than nine emitters. In accordance with embodiments of the invention, each emitter may emit a single beam, or, each of the emitters may emit multiple beams. The view of FIG. 11 is along the WBC dimension, i.e., the dimension in which the beams from the bars are combined. The exemplary resonator 1100 features nine diode bars 1105, and each diode bar 1105 includes, consists essentially of, or consists of an array (e.g., one-dimensional array) of emitters along the WBC dimension. In various embodiments, each emitter of a diode bar 1105 emits a non-symmetrical beam having a larger divergence in one direction (known as the "fast axis," here oriented vertically relative to the WBC dimension) and a smaller divergence in the perpendicular direction (known as the "slow axis," here along the WBC dimension).

In various embodiments, each of the diode bars 1105 is associated with (e.g., attached or otherwise optically coupled to) a fast-axis collimator (FAC)/optical twister microlens assembly that collimates the fast axis of the emitted beams while rotating the fast and slow axes of the beams by 90°, such that the slow axis of each emitted beam is perpendicular to the WBC dimension downstream of the microlens assembly. The microlens assembly also converges the chief rays of the emitters from each diode bar 1105 toward a dispersive element 1110. Suitable microlens assemblies are described in U.S. Pat. No. 8,553,327, filed on Mar. 7, 2011, and U.S. Pat. No. 9,746,679, filed on Jun. 8, 2015, the entire disclosure of each of which is hereby incorporated by reference herein.

In embodiments of the invention in which both a FAC lens and an optical twister (e.g., as a microlens assembly) are associated with each of the beam emitters and/or emitted beams, and SAC lenses (as detailed below) affect the beams in the non-WBC dimension. In other embodiments, the emitted beams are not rotated, and FAC lenses may be utilized to alter pointing angles in the non-WBC dimension.

Thus, it is understood that references to SAC lenses herein generally refer to lenses having power in the non-WBC dimension, and such lenses may include FAC lenses in various embodiments. Thus, in various embodiments, for example embodiments in which emitted beams are not rotated and/or the fast axes of the beams are in the non-WBC dimension, FAC lenses may be utilized as detailed herein for SAC lenses.

As shown in FIG. 11, resonator 1100 also features a set of SAC lenses 1115, one SAC lens 1115 associated with, and receiving beams from, one of the diode bars 1105. Each of the SAC lenses 1115 collimates the slow axes of the beams emitted from a single diode bar 1105. After collimation in the slow axis by the SAC lenses 1115, the beams propagate to a set of interleaving mirrors 1120, which redirect the beams 1125 toward the dispersive element 1110. The arrangement of the interleaving mirrors 1120 enables the free space between the diode bars 1105 to be reduced or minimized. Upstream of the dispersive element 1110 (which may include, consist essentially of, or consist of, for example, a diffraction grating such as the transmissive diffraction grating depicted in FIG. 11, or a reflective diffraction grating), a lens 1130 may optionally be utilized to collimate the sub-beams (i.e., emitted rays other than the chief rays) from the diode bars 1105. In various embodiments, the lens 1130 is disposed at an optical distance away from the diode bars 1105 that is substantially equal to the focal length of the lens 1130. Note that, in typical embodiments, the overlap of the chief rays at the dispersive element 1110 is primarily due to the redirection of the interleaving mirrors 1120, rather than the focusing power of the lens 1130.

Also depicted in FIG. 11 are lenses 1135, 1140, which form an optical telescope for mitigation of optical cross-talk, as disclosed in U.S. Pat. No. 9,256,073, filed on Mar. 15, 2013, and U.S. Pat. No. 9,268,142, filed on Jun. 23, 2015, the entire disclosure of which is hereby incorporated by reference herein. Resonator 1100 may also include one or more optional folding mirrors 1145 for redirection of the beams such that the resonator 1100 may fit within a smaller physical footprint. The dispersive element 1110 combines the beams from the diode bars 1105 into a single, multi-wavelength beam 1150, which propagates to a partially reflective output coupler 1155. The coupler 1155 transmits a portion of the beam as the output beam of resonator 1100 while reflecting another portion of the beam back to the dispersive element 1110 and thence to the diode bars 1105 as feedback to stabilize the emission wavelengths of each of the beams.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

The invention claimed is:

1. A method of processing a workpiece with a laser beam, the method comprising:
providing an optical fiber having an input end and an output end opposite the input end, wherein the optical fiber comprises (i) a center core having a first refractive index, (ii) surrounding the center core, a first cladding having a second refractive index smaller than the first refractive index, (iii) surrounding the first cladding, an annular core, and (iv) surrounding the annular core, a second cladding having a third refractive index smaller than the first refractive index, and wherein the annular core comprises (a) a first region having a fourth refractive index greater than the second refractive index, and (b) a second region having a fifth refractive index greater than the second refractive index and smaller than the fourth refractive index;
disposing a workpiece proximate the output end of the optical fiber;
determining at least one of a beam parameter product or a numerical aperture for processing of the workpiece based at least in part on at least one of (i) a type of processing to be performed on the workpiece, (ii) a property of the workpiece, or (iii) a processing path along which the workpiece is to be processed;
directing a laser beam onto one or more in-coupling locations on the input end of the optical fiber to select the at least one of the beam parameter product or the numerical aperture of the laser beam emitted from the output end of the optical fiber; and
processing the workpiece with the laser beam emitted from the output end of the optical fiber.

2. The method of claim 1, wherein the first region is disposed between the second region and the second cladding.

3. The method of claim 1, wherein the second region is disposed between the first region and the second cladding.

4. The method of claim 1, wherein the second refractive index is equal to the third refractive index.

5. The method of claim 1, wherein the second refractive index is larger than the third refractive index.

6. The method of claim 1, wherein the second refractive index is smaller than the third refractive index.

7. The method of claim 1, wherein the fourth refractive index is equal to the first refractive index.

8. The method of claim 1, wherein the fourth refractive index is larger than the first refractive index.

9. The method of claim 1, wherein the fourth refractive index is smaller than the first refractive index.

10. The method of claim 1, wherein the fifth refractive index is equal to the first refractive index.

11. The method of claim 1, wherein the fifth refractive index is larger than the first refractive index.

12. The method of claim 1, wherein the fifth refractive index is smaller than the first refractive index.

13. The method of claim 1, wherein a thickness of the first region is equal to a thickness of the second region.

14. The method of claim 1, wherein a thickness of the first region is less than a thickness of the second region.

15. The method of claim 1, wherein a thickness of the first region is greater than a thickness of the second region.

16. The method of claim 1, wherein processing the workpiece comprises physically altering at least a portion of a surface of the workpiece.

17. The method of claim 1, wherein processing the workpiece comprises at least one of cutting, welding, etching, annealing, drilling, soldering, or brazing.

* * * * *